(12) United States Patent
Zhang et al.

(10) Patent No.: US 8,265,421 B2
(45) Date of Patent: Sep. 11, 2012

(54) VIDEO SYSTEM WITH BLOCKING ARTIFACT TWO-DIMENSIONAL CROSS FILTERING

(75) Inventors: Ximin Zhang, San Jose, CA (US); Ming-Chang Liu, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 979 days.

(21) Appl. No.: 12/266,551

(22) Filed: Nov. 6, 2008

(65) Prior Publication Data
US 2010/0111435 A1   May 6, 2010

(51) Int. Cl.
  *G06K 9/40* (2006.01)
(52) U.S. Cl. .......... 382/275; 382/261; 382/268
(58) Field of Classification Search ........... 382/275
  See application file for complete search history.

(56) References Cited

U.S. PATENT DOCUMENTS

| | | | |
|---|---|---|---|
| 6,219,436 B1 * | 4/2001 | De Haan et al. | 382/107 |
| 6,285,801 B1 | 9/2001 | Mancuso et al. | |
| 6,600,839 B2 * | 7/2003 | Mancuso et al. | 382/268 |
| 6,950,562 B2 * | 9/2005 | Rouvellou | 382/264 |
| 7,346,224 B2 * | 3/2008 | Kong et al. | 382/261 |
| 7,362,810 B2 | 4/2008 | Wang | |
| 7,373,014 B1 * | 5/2008 | Mancuso et al. | 382/268 |
| 7,397,854 B2 * | 7/2008 | Kwon et al. | 375/240.03 |
| 7,426,315 B2 * | 9/2008 | Frishman et al. | 382/268 |
| 2005/0163395 A1 * | 7/2005 | Gesnot | 382/268 |
| 2005/0281339 A1 * | 12/2005 | Song | 375/240.24 |
| 2007/0071095 A1 * | 3/2007 | Lim | 375/240.08 |

FOREIGN PATENT DOCUMENTS

| | | |
|---|---|---|
| EP | 1555832 A2 | 7/2005 |
| WO | 9642165 A2 | 12/1996 |

OTHER PUBLICATIONS

Ying Luo and Rabab K. Ward, "Removing the Blocking Artifacts of Block-Based DCT Compressed Images", , IEEE Transactions on Image Processing, Jul. 7, 2003, vol. 12, Issue 7, pp. 838-842.

Dung Trung Vo, Sehoon Yea, Anthony Vetro, "Spatio-Temporal Fuzzy Filtering for Coding Artifacts Reduction", SPIE Conf on Visual Communications and Image Processing, Jan. 2008, TR2007-077 Apr. 8, Mitsubishi Electric Research Laboratories, Inc., Cambridge, MA.

Yao Nie, Hao-Song Kong, Anthony Vetro, and Kenneth E. Barner, "Fast Adaptive Fuzzy Post-Filtering for Coding Artifacts Removal in Interlaced Video", IEEE International Conference on Acoustics, Speech and Signal Processing (ICASSP), Dec. 5, pp. 993-996, vol. 2, Mitsubishi Electric Research Laboratories, Inc., Cambridge, MA.

(Continued)

*Primary Examiner* — David Zarka
(74) *Attorney, Agent, or Firm* — Ishimaru & Associates LLP; Mikio Ishimaru; Stanley M. Chang (57) ABSTRACT

A video system includes: analyzing video data, having a block; performing a transition change detection for determining a spatial intensity transition within the block; performing a block-wise similarity measurement on the block in the video data for identifying a blocking artifact; and filtering with a two dimensional cross filter every pixel in the block for removing the blocking artifact.

17 Claims, 7 Drawing Sheets

OTHER PUBLICATIONS

Hao-Song Kong, Yao Nie, Anthony Vetro, Huifang Sun, Kenneth E. Barner, "Coding Artifact Reduction Using Edge Map Guided Adaptive and Fuzzy Filter", IEEE International Conference on Multimedia and Expo (ICME), Jun. 4 (ICME 2004), Mitsubishi Electric Research Laboratories, Inc., Cambridge, MA.

Hao-Song Kong, Anthony Vetro, Huifang Sun, "Edge Map Guided Adaptive Post-Filter for Blocking and Ringing Artifacts Removal", IEEE International Symposium on Circuits and Systems (ISCAS), Feb. 4, vol. 3, pp. 929-932, Mitsubishi Electric Research Laboratories, Inc., Cambridge, MA.

* cited by examiner

VIDEO SYSTEM WITH BLOCKING ARTIFACT TWO-DIMENSIONAL CROSS FILTERING

TECHNICAL FIELD

The present invention relates generally to video decompression for high definition applications, and more particularly to a system for addressing the picture degradation caused by picture compression algorithms.

BACKGROUND ART

With the transition to digital television mandated by the United States government, many manufacturers are actively preparing to deal with a broad range of quality in broadcast and downloaded programming. Many consumers are already confining their video applications to a single unit. In many cases, a computer monitor might support computer applications, down loaded video applications and broadcast television programs. Some families have chosen to utilize a central television for family viewing and computer applications.

A trend has started as more and more families replace their old CRT television with big screen LCD and Plasma televisions with high definition television (HDTV) capabilities. While the new technologies provided better experience with higher resolution and more details, they also reveal more obvious artifacts and noise if the received signals are not of a good enough quality. For instance, displaying YouTube™ video clip on the HDTV will show very ugly coding artifacts caused by the compression algorithm. Technology that can produce superior visual quality on the digital video and image products is highly desirable.

In the current digital video and image standard, block based transformation and quantization of transform coefficients are used to achieve high compression efficiency. Since quantization is a process subject to losing detail, the combination of block based transform and quantization may generate some perceptually annoying artifacts such as blocking artifacts and ringing artifacts.

A blocking artifact may be an artificially induced pattern or intensity change that may be generated when a block of compressed video data is decompressed for display purposes. The blocking artifact, if it is present, will show-up at the boundaries of the decompressed block of video data. As a single block represents only a small portion of a video picture, hundreds or thousands of these blocking artifacts may be present in a single frame of video data. Left unaddressed, these artifacts may ruin the picture completely.

These artifacts may show up on the viewing screen as sharp discontinuities or blurry areas in a textured pattern. Since coding artifacts reduction is fundamental to many image processing applications, it has been investigated for many years.

Many post-processing methods have been proposed. In general, most prior art methods either focus on blocking artifacts reduction or ringing artifacts reduction. To reduce the blocking artifacts, most prior arts methods only focus on the block boundary pixels, the general quantization noise in the middle of the block has not been handled. Also, the deblocking process depends on the quantization parameter. Obviously, these approaches are not effective. Although some of prior art methods show very good results on the selected applications, they are not good enough for new digital HDTV. As the result, either the artifacts are still visible or the texture detail is blurred.

Many of the consumers have questioned why the original mandate was put in place. With the purchase of a new HDTV, they are not satisfied with the picture quality of many applications that they have enjoyed for some time. Consumers mistakenly believe that their newly purchased HDTV is faulty in some way. The actual culprit is the compression algorithm that was used to process the data for transmission.

Thus, a need still remains for a blocking artifact filter system that can provide a crisp picture without losing the texture detail from the picture. In view of the mandated transition to all digital television broadcast called for by the United States government, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to save costs, improve efficiencies and performance, and meet competitive pressures, adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a video system including: analyzing video data, having a block; performing a transition change detection for determining a spatial intensity transition within the block; performing a block-wise similarity measurement on the block in the video data for identifying a blocking artifact; and filtering with a two dimensional cross filter every pixel in the block for removing the blocking artifact.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail. Likewise, the drawings showing embodiments of the system are semi-diagrammatic and not to scale and, particularly, some of the dimensions are for the clarity of presentation and are shown greatly exaggerated in the drawing FIGS. Where multiple embodiments are disclosed and described, having some features in common, for clarity and ease of illustration, description, and comprehension thereof, similar and like features one to another will ordinarily be described with like reference numerals.

For expository purposes, the term "horizontal" as used herein is defined as a plane parallel to the plane or surface of the Earth at a point, regardless of its orientation. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane. The term "on" means there is direct contact among elements. The term "system" as used herein means and refers to the method and to the apparatus of the present invention in accordance with the context in which the term is used. The term "processing" as used herein includes calculating, manipulating, ordering, measuring, filtering, or displaying as required in forming a described structure.

Figure 1:
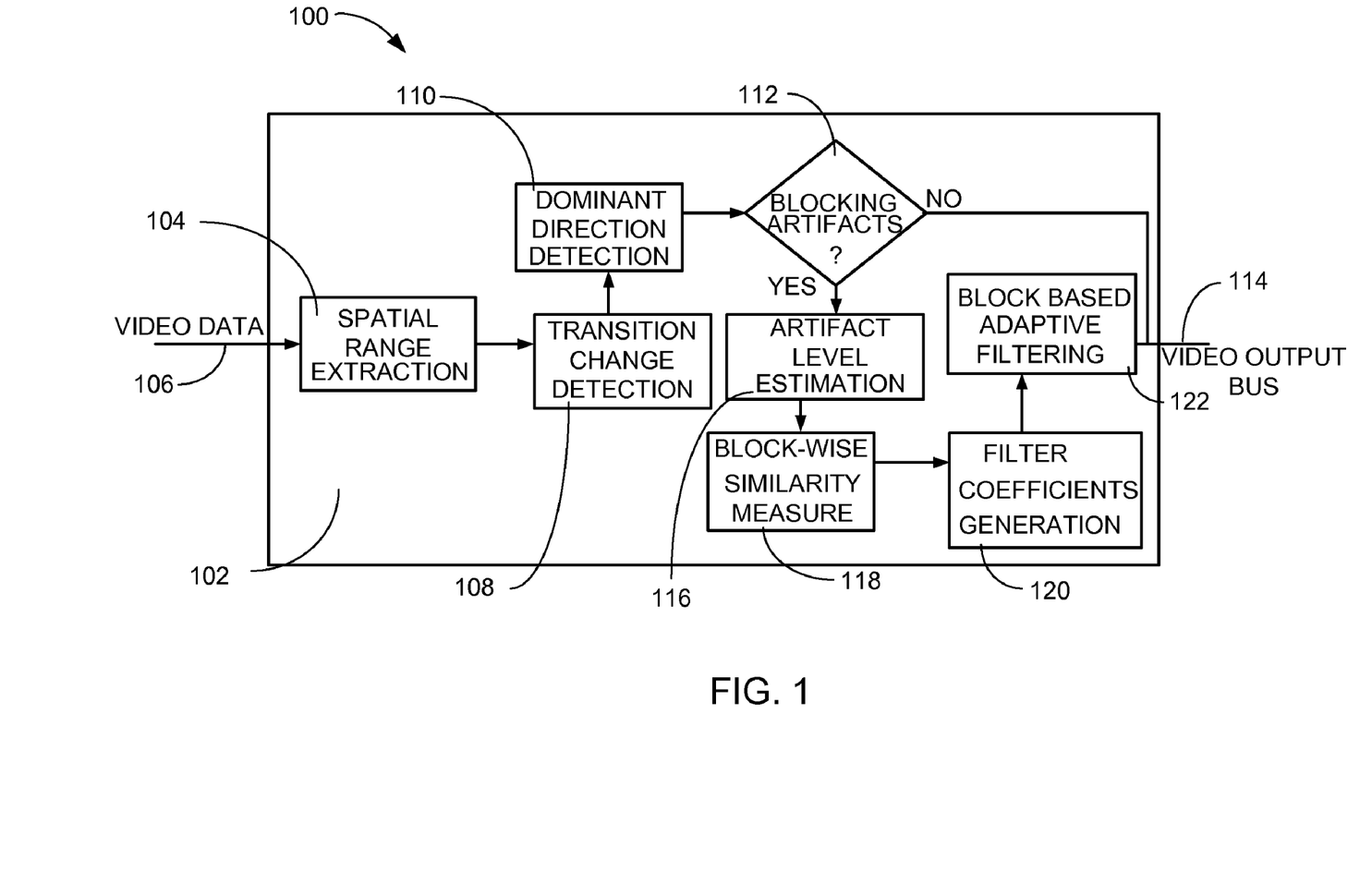
FIG. 1 is a functional block diagram of a video system with blocking artifact filtering, in an embodiment of the present invention.

Referring now to FIG. 1, therein is shown a functional block diagram of a video system with blocking artifact filtering 100, in an embodiment of the present invention. The functional block diagram of the video system 100 depicts a circuit element 102, such as an integrated circuit, a circuit board, or a flex circuit, having a spatial range extraction circuit 104 for determining the range of intensities in an uncompressed block of video data 106. The spatial range extraction circuit 104 may be coupled to a transition change detector 108.

The transition change detector 108 calculates an intensity transition or spatial variation for both the vertical and horizontal directions at the same time for detecting a natural transition change in the spatial variation. It has been discovered that blocking artifacts usually share common phenomena including the spatial variation that is very small relative to the rest of the block and there is an abrupt intensity change along the direction of the small spatial variation direction in the block boundary. The direction of the small spatial variation is known as the dominant direction and may be identified by a dominant direction detection block 110.

A blocking artifact detector 112 may detect the presence of the blocking artifact by monitoring the intensity changes in the dominant direction. If no blocking artifact is detected in the uncompressed block of video data, the block is passed without filtering to a video output bus 114. By not applying filtering to a block that does not have blocking artifacts, the process preserves the natural edge smoothness and sharpness for generating natural intensity transitions between the uncompressed blocks of the video data 106.

If the blocking artifact detector 112 determines that blocking artifacts are present in the uncompressed block of video data, an artifact level estimation block 116 may process the data. The artifact level estimation block 116 differentiates the natural transition with texture and edge from the encoding artifacts caused changes. The data is then passed to a block-wise similarity checker 118, for comparison with adjacent blocks of the uncompressed video data. This mechanism helps differentiate the natural transitions between blocks from the blocking artifacts induced by the compression algorithm.

A filter coefficients generator 120 may be used to determine the amount of filter correction that is appropriate for the current uncompressed block of the video data 106. The filter coefficients are passed with the data to an adaptive filtering circuit 122. The adaptive filtering circuit 122 may apply the filter coefficients to all of the pixels in the block of uncompressed video data. The output of the adaptive filtering circuit 122 passes the filtered data to the video output bus 114 for display.

Figure 2:
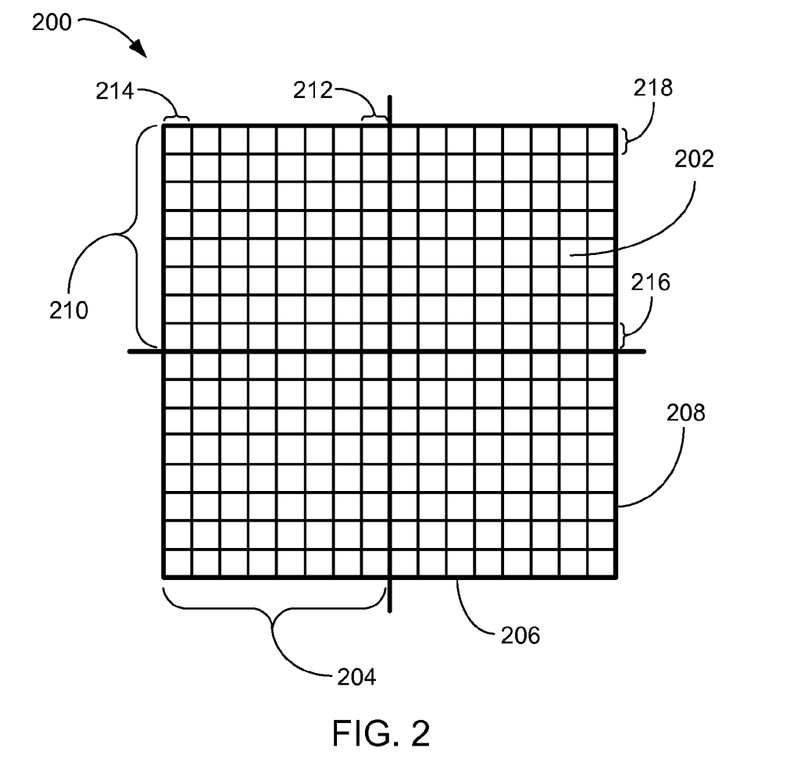
FIG. 2 is a diagram of a segment of a video picture during an uncompress process.

Referring now to FIG. 2, therein is shown a diagram of a segment of a video picture 200 during an uncompress process. The diagram of the segment of the video picture 200 depicts an array of a pixel 202, such as the smallest component of a video picture, not shown. The segment of the video picture 200 may be formed by a series of a block 204, such as an uncompressed block of video data, which may be aligned to display the current picture, not shown. Each of the block 204 may have a horizontal boundary 206 and a vertical boundary 208. An adjacent block 210 may be present on the horizontal boundary 206 or the vertical boundary 208.

The number of the pixel 202 that may be aligned along the horizontal boundary 206 and the vertical boundary 208 may be dependent on the compression scheme used to prepare the data. In the embodiment example, the block 204 of the uncompressed video data is represented by 64 of the pixels 202 forming an 8×8 pattern. Each of the blocks 204 may have a first column 212, a last column 214, a first row 216, and a last row 218.

Figure 3:
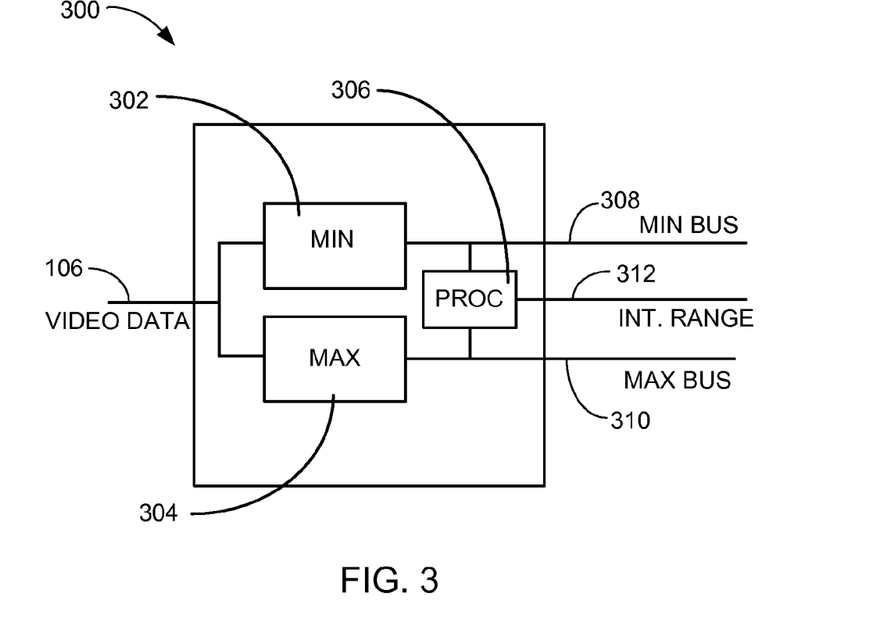
FIG. 3 is a functional block diagram of a spatial range extraction circuit, in an embodiment of the present invention.

Referring now to FIG. 3, therein is shown a functional block diagram of a spatial range extraction circuit 300, in an embodiment of the present invention. The functional block of the spatial range extraction circuit 300 depicts the video data 106 coupled to a minimum intensity detector 302 and a maximum intensity detector 304. A difference processor 306 may be coupled between a minimum bus 308 and a maximum bus 310. The output of the difference processor 306 may be an intensity range 312. The intensity range 312 may provide an intensity range value to the next level of logic, not shown.

As the block 204, of FIG. 2, is processed the data from each of the pixels 202 passes through the minimum intensity detector 302 and the maximum intensity detector 304. When the block 204 has been completely measured, the intensity range is gated out of the difference processor 306. An equation for the intensity range 312 may include:

$$BK_{range} = P_{MAX} - P_{MIN} \quad \text{(Equation 1)}$$

Where the intensity range ($BK_{range}$) is equal to the maximum intensity pixel value ($P_{MAX}$) minus the minimum intensity pixel value ($P_{MIN}$).

Figure 4:
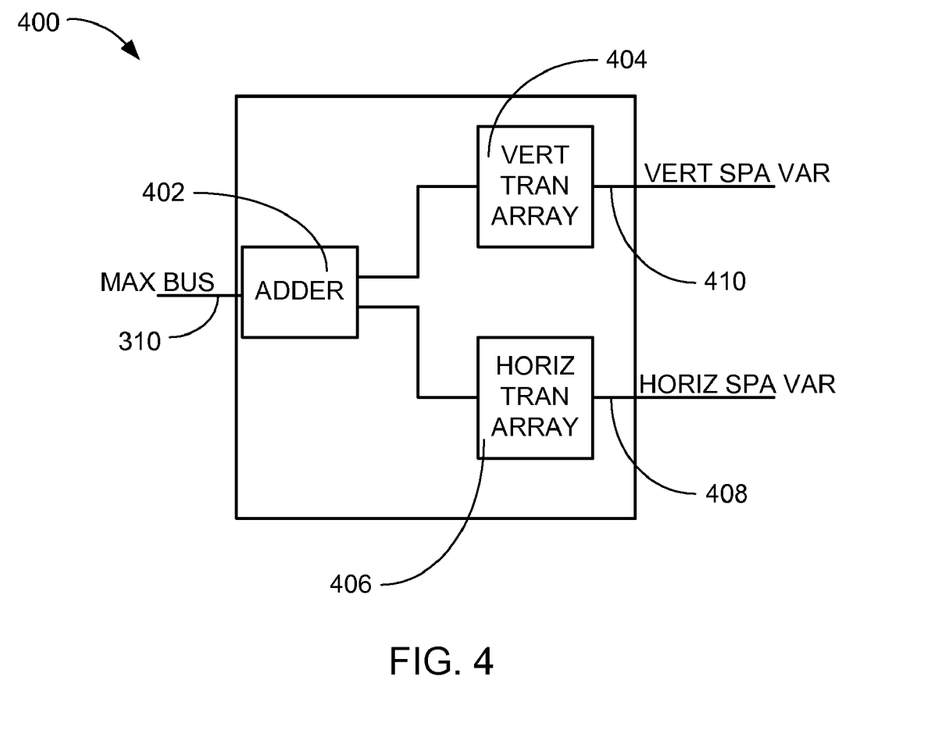
FIG. 4 is a block diagram of a transition change detection circuit, in an embodiment of the present invention.

Referring now to FIG. 4, therein is shown a block diagram of a transition change detector 400, in an embodiment of the present invention. The block diagram of the transition change detector 400 depicts an adder 402 coupled to the maximum bus 310. The adder 402 may also be coupled to a vertical transition array 404 and a horizontal transition array 406. The adder 402 provides control logic that stores the intensity change between the pixels 202, of FIG. 2, in the proper location for the block 204, of FIG. 2, being analyzed. The transition change between the pixels 202 may be identified by a horizontal spatial variation 408 and a vertical spatial variation 410. The adder 402 may provide the logic required to solve the array calculation of equations 2 and 3 as shown below:

$$Var_{ver} = \sum_{i=1}^{i=M-1} \sum_{j=1}^{j=M} (p(i, j) - p(i+1, j))^2 \quad \text{(Equation 2)}$$

$$Var_{hor} = \sum_{i=1}^{i=M} \sum_{j=1}^{j=M-1} (p(i, j) - p(i, j+1))^2 \quad \text{(Equation 3)}$$

The number of the pixels 202 aligned on the edge of the block is represented by M. The vertical spatial variation may be represented by $Var_{ver}$ and the horizontal spatial variation may be represented by $Var_{hor}$. The pixel 202 intensity may be represented by p(i, j) where i represents the vertical position and j represents the horizontal position in the block 204. In this example the size of the block 204 is equal in the horizontal and vertical directions, but this is not a requirement and the dimensions may differ in some compression algorithms.

By storing the variation in intensity between the pixels 202, any significant changes may be quickly recognized. Since one of the characteristics of a blocking artifact was discovered to be an abrupt change in the intensity, the transition change detector 400 may quickly identify possible locations of the blocking artifact.

Figure 5:
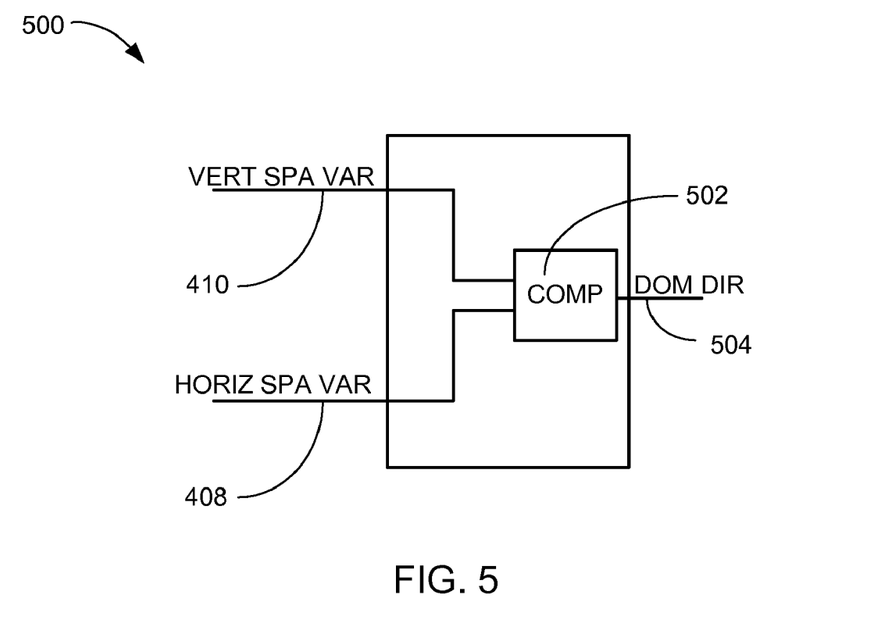
FIG. 5 is a block diagram of a dominant direction detection circuit, in an embodiment of the present invention.

Referring now to FIG. 5, therein is shown a block diagram of a dominant direction detection circuit 500, in an embodiment of the present invention. The block diagram of the dominant direction detection circuit 500 depicts a comparator 502 that may be coupled to the transition change detector 400 by the horizontal spatial variation 408 and the vertical spatial variation 410. The comparator may monitor the horizontal spatial variation 408 and the vertical spatial variation 410 in order to determine which has the smaller spatial variation. A dominant direction output 504 may indicate whether the vertical direction or the horizontal direction is dominant.

Figure 6:
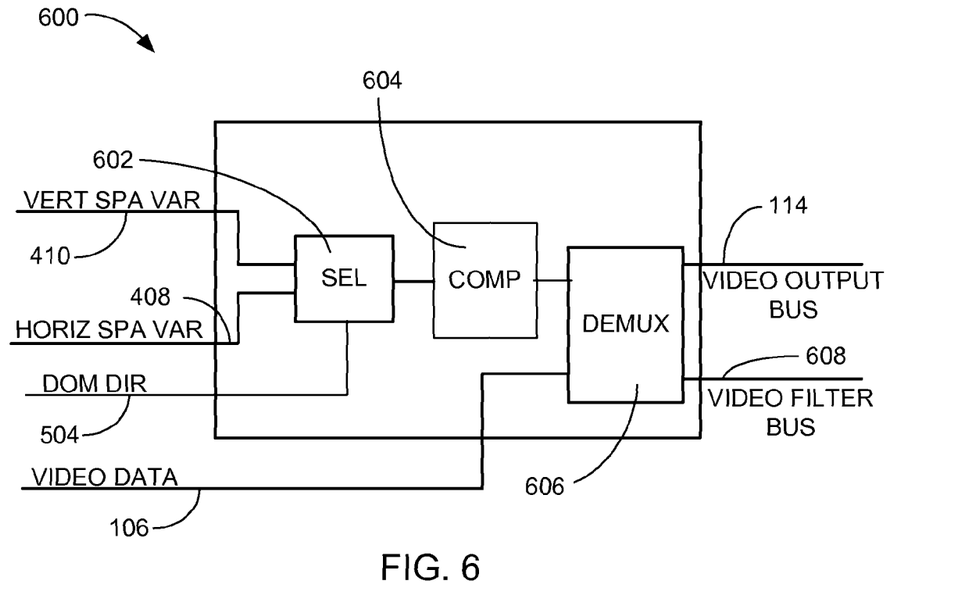
FIG. 6 is a block diagram of a blocking artifact detection circuit, in an embodiment of the present invention.

Referring now to FIG. 6, therein is shown a block diagram of a blocking artifact detection circuit 600, in an embodiment of the present invention. The block diagram of the blocking artifact detection circuit 600 depicts a selector 602 that may be controlled by the dominant direction output 504. The selector 602 may be designed to pass the horizontal spatial variation 408 or the vertical spatial variation 410 based on the value of the dominant direction output 504. A magnitude comparator 604 may manipulate the horizontal spatial variation 408 or the vertical spatial variation 410, depending on which is selected, in order to detect the presence of a blocking artifact. If the selected input meets the following criteria, it means that no blocking artifact is present in the block 204, of FIG. 2, and the block 204, in the video data 106, is sent on without any additional filtering. The criteria for determining the presence of the blocking artifact is shown in Equation 4 below.

$$Var > 2 * BK_{range} \cdot BK_{range} \quad \text{(Equation 4)}$$

If the criteria of equation 4 are not satisfied, it is still possible that no blocking artifact is present. It can be further analyzed by the equations 5 through 9 as shown below:

$$Diff_{ver} = \sum_{j=1}^{j=M} ((p(0, j) - p(1, j))^2 + (p(M, j) - p(M+1, j))^2) \quad \text{(Equation 5)}$$

$$Dominance_{level} = \begin{cases} 0 & Var_{ver} < Var_{hor}/2 \\ 2 & \text{otherwise} \end{cases} \quad \text{(Equation 6)}$$

Equations 5 and 6 may be used to establish a dominance value of the vertical direction. The dominance of the horizontal direction may be determined by the equations 7 and 8 as shown below.

$$Diff_{hor} = \sum_{i=1}^{i=M} ((p(i, 0) - p(i, 1))^2 + (p(i, M) - p(i, M+1))^2) \quad \text{(Equation 7)}$$

$$Dominance_{level} = \begin{cases} 1 & Var_{hor} < Var_{ver}/2 \\ 2 & \text{otherwise} \end{cases} \quad \text{(Equation 8)}$$

Equation 9 may be used to determine whether a blocking artifact is present. If the resulting $Blocking_{factor}$ is less than 2, it would indicate that no blocking artifact is present.

$$Blocking_{factor} = Diff/2M - Var/M*(M-1) \quad \text{(Equation 9)}$$

If no blocking artifact is present as determined by equations 5 through 9, the block 204 is sent on without any additional filtering. In equation 9, the value of Diff may be determined by equation 5 or equation 7 whichever is determined to be dominant. The value of Var is determined by equation 2 or equation 3 also selected by the dominant direction. The value of M is dependent on the number of the pixels 202, of FIG. 2, used to form the block 204 by the compression algorithm. In equation 4, the Var represents the value of the selected input and the $BK_{range}$ is the output of equation 1 as shown above. The implementation of the blocking artifact detector circuit 600 is an example only and other implementations are possible.

A video demultiplexer 606 may be used to guide the video data 106 to the video output bus 114 or a video filter bus 608 for further processing. If the magnitude comparator 604 determines that no blocking artifact is present, the video data 106 is passed to the video output bus 114. If the magnitude comparator 604 determines that a blocking artifact is present, the video data 106 is passed to a video filter bus 608 for further processing.

Figure 7:
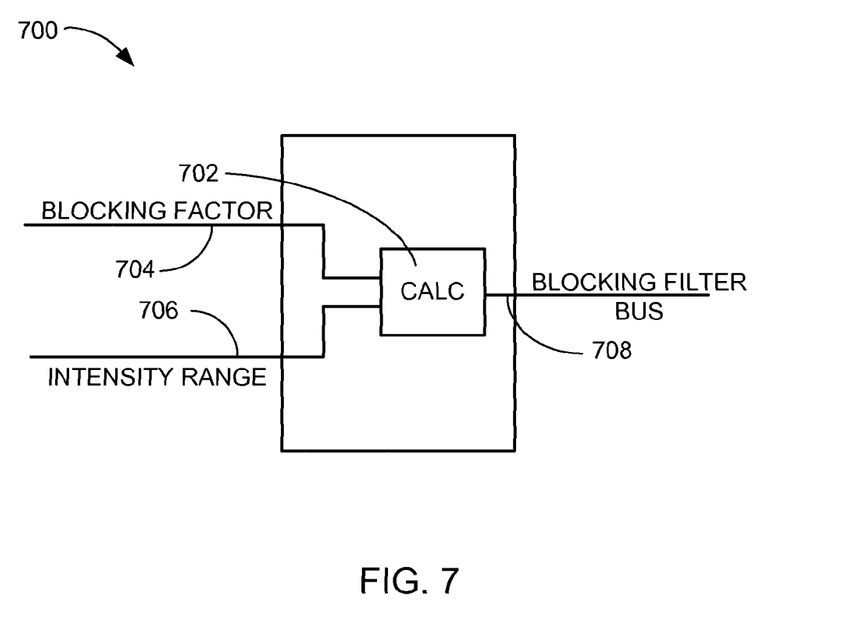
FIG. 7 is a block diagram of an artifact level estimation circuit, in an embodiment of the present invention.

Referring now to FIG. 7, therein is shown a block diagram of an artifact level estimation circuit 700, in an embodiment of the present invention. The block diagram of the artifact level estimation circuit 700 depicts a blocking level calculator 702 that receives a blocking factor 704 and an intensity range 706 from the dominant direction decision. The blocking level is determined in the blocking level calculator 702 per equation 10 as shown below.

$$Blocking_{level} = \quad \text{(Equation 10)}$$
$$\begin{cases} Blocking_{factor} * C1, & Var == 0 \\ Blocking_{factor} * BK_{range}^2 * C2/Var, & \text{otherwise} \end{cases}$$

In equation 10 the values of C1 and C2 are experimentally derived and are constants. In order to properly determine the level of blocking artifacts, a threshold must be determined. The threshold value may be used to adjust the response to the blocking level determined by equation 10. The equation used to evaluate the blocking level threshold is shown in equation 11 below.

$$Blocking_{level} = \begin{cases} T1, & Blocking_{level} > T1 \\ T2, & Blocking_{level} < T2 \end{cases} \quad \text{(Equation 11)}$$

The values of T1 and T2 are constants that were experimentally derived. If the block 204, of FIG. 2, is determined to be a non-blocking artifacts block, the block 204 is sent on without any additional filtering. A blocking filter bus 708 may provide the output of the blocking level calculator 702 to the next level system, not shown.

Figure 8:
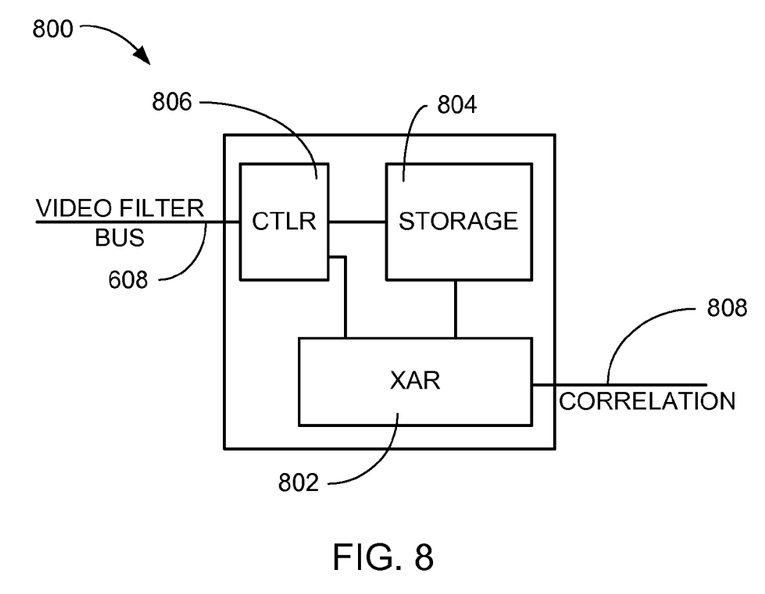
FIG. 8 is a block diagram of a block correlation processor, in an embodiment of the present invention.

Referring now to FIG. 8, therein is shown a block diagram of a block correlation processor 800, in an embodiment of the present invention. The block diagram of the block correlation processor 800 depicts an execution array (XAR) 802, such as a math processor or dedicated logic capable of performing mean squared error (MSE) calculations, coupled to a storage device 804. The storage device 804 may be a random access memory that is capable of holding many of the blocks 204, of FIG. 2. The storage device 804 may be managed by a controller 806 for providing information on the blocks 204 to the execution array 802. The controller 806 may receive the video filter bus 608 for mapping the storage device 804 with the blocks 204. A correlation output 808 may be sourced from the execution array 802 as an indication of the similarity between the blocks 204 that may be adjacent within the full picture, not shown.

Figure 9:
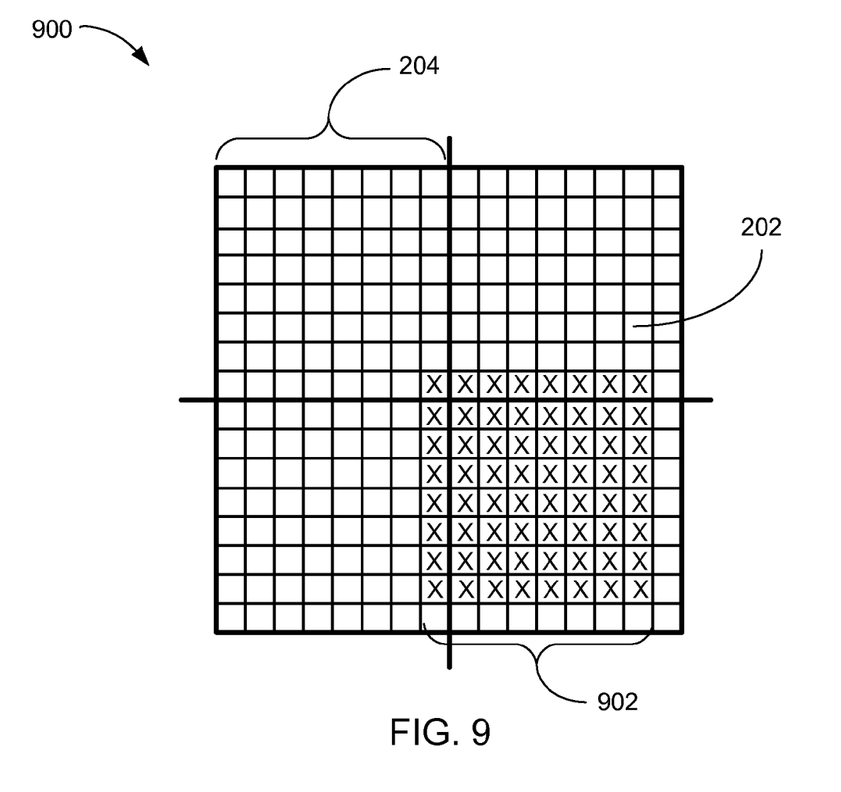
FIG. 9 is a diagram of a segment of a video picture during a block-wise similarity measurement.

Referring now to FIG. 9, therein is shown a diagram of a segment 900 of a video picture during a block-wise similarity measurement. The diagram of the segment 900 depicts the blocks 204 arranged in an adjacent pattern as in the video picture of which they are a part. During the block-wise similarity measurement the correlation processor 800, of FIG. 8, may overlay the current unit of the block 204 on the blocks 204 that are adjacent to it. The correlation of the blocks 204 may be judged by applying equation 12 as shown below.

$$Diff(k, l) = \sum_{i=1}^{i=M} \sum_{j=1}^{j=M} (b_{m,n}(i, j) - b_{m-k,n-l}(i, j))^2 \quad \text{(Equation 12)}$$

In equation 12, $b_{m,n}(i, j)$ denotes the pixels 202 in the block 204 in position (i,j), k denotes the vertical shifting position relative to the block 204 being analyzed, l denotes the horizontal shifting position relative to the block 204 being analyzed, and M denotes the block side length as shown in FIG. 2. For instance, M=8 for 8×8 block. An analysis area 902 indicates that the block-wise similarity measurement has stepped a count of 1 in the vertical and horizontal directions. During the block-wise similarity measurement, the analysis area 902 will be stepped in the vertical and horizontal directions independently. The step will continue between 1 and M in both the vertical and horizontal directions until the adjacent blocks are measured.

Figure 10:
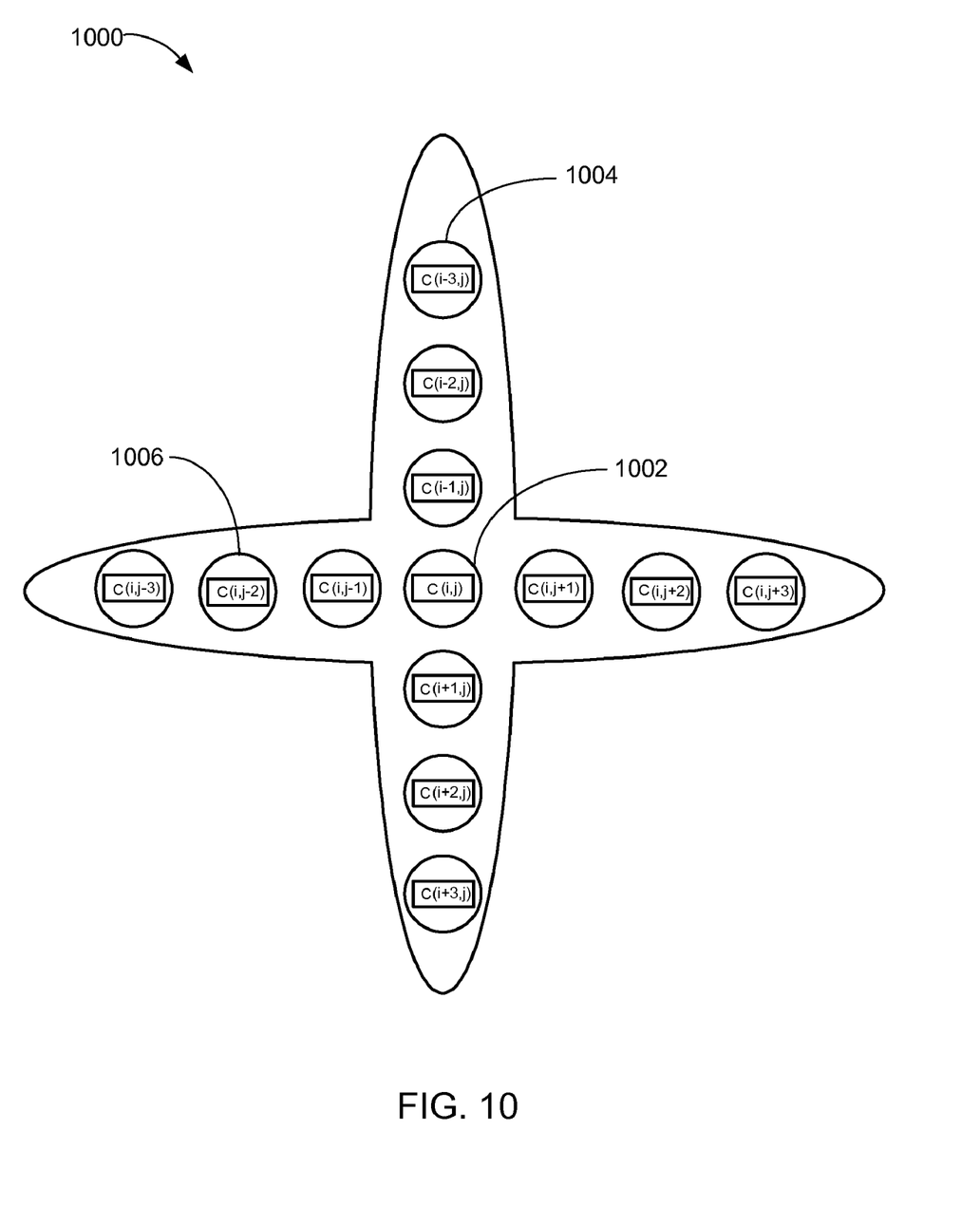
FIG. 10 is a diagram of a two dimensional cross filter 1000, in an embodiment of the present invention.

Referring now to FIG. 10, therein is shown a diagram of a two dimensional cross filter 1000, in an embodiment of the present invention. The diagram of the two dimensional cross filter 1000 depicts a center tap 1002, which may have 12 taps in addition to the center tap 1002 to support either horizontal or vertical filtering of the video data 106, of FIG. 1. The center tap 1002 may have vertical taps 1004 positioned symmetrically above and below the center tap 1002 in a vertical orientation. Likewise, there are horizontal taps 1006 positioned symmetrically right and left of the center tap 1002 in a horizontal orientation. There may be six of the vertical taps 1004 and six of the horizontal taps 1006 in an embodiment of the present invention. Other numbers of the vertical taps 1004 and the horizontal taps 1006 may be possible. The two dimensional cross filter 1000 may also be known as a symmetrical filter due to the position of the taps and the weighting of a filter coefficient 1008 established for the vertical taps 1004 and the horizontal taps 1006.

Let C(k,1) denote the filter coefficient 1008 for the pixel 202, of FIG. 2, in position (i+k, j+l), the initial coefficient value can be obtained by following procedure.

$$\text{If } Diff(k, l) < \frac{Blocking_{level}}{8}, C(k, l) = 8 \quad \text{(Equation 13)}$$

$$\text{Else if } Diff(k, l) < \frac{Blocking_{level}}{4}, C(k, l) = 4 \quad \text{(Equation 14)}$$

$$\text{Else if } Diff(k, l) < \frac{Blocking_{level}}{2}, C(k, l) = 2 \quad \text{(Equation 15)}$$

$$\text{Else if } Diff(k, l) < Blocking_{level}, C(k, l) = 1 \quad \text{(Equation 16)}$$

$$\text{Else } C(k, l) = 0 \quad \text{(Equation 17)}$$

In the present invention, symmetrical filtering is designed for horizontal and vertical filtering. At most seven tap filtering is applied along each direction. Therefore, we have a 13 tap cross filtering as shown in FIG. 10. Before the filtering, we first calculate the horizontal filter coefficients as following two steps:

First calculate C(0, 1) according to the above procedure for l=−3 . . . 3. Then adjust the horizontal filter coefficient values as defined by equation 18 below.

$$C(0, l) = \min(C(0, l), C(0, -l)) \quad \text{(Equation 18)}$$

The vertical filter coefficients may then be calculated by applying the following two steps. First calculate C(k,0) according to the above procedure for k=−3 . . . 3. Then adjust the vertical filter coefficient values as defined by equation 19 below.

$$C(k, 0) = \min(C(k, 0), C(-k, 0)) \quad \text{(Equation 19)}$$

When analyzing the block 204, of FIG. 2, for the blocking artifacts, it is understood that only the pixels 202, of FIG. 2, in the boundary positions, such as the first column 212, of FIG. 2, the last column 214, of FIG. 2, the first row 216, of FIG. 2, or the last row 218, of FIG. 2, may be affected. The orientation of the blocking artifact, if it is present, will be determined by the dominant direction as calculated in equations 6 and 8 above. If the dominant direction is not vertical, indicated by $Dominance_{level} \neq 0$, a one dimensional seven tap filter may be applied to the pixels 202 in the first column and the last column respectively as defined in equation 20 below.

$$F(i, 1) = \frac{\sum_{l=-3}^{l=3} C'(0, l) * p(i, l+1)}{\sum_{l=-3}^{l=3} C'(0, l)}, \quad \text{(Equation 20)}$$

-continued $$F(i, M) = \frac{\sum_{l=-3}^{l=3} C'(0, l) * p(i, l + M)}{\sum_{l=-3}^{l=3} C'(0, l)}$$

If the dominant direction is not horizontal, indicated by $Domiance_{level} \neq 1$, a one dimensional seven tap filter may be applied to the pixels 202 in the first row and the last row respectively as defined in equation 21 below.

$$F(1, j) = \frac{\sum_{k=-3}^{k=3} C'(k, 0) * p(k + 1, j)}{\sum_{k=-3}^{k=3} C'(k, 0)},$$ (Equation 21)

$$F(M, j) = \frac{\sum_{k=-3}^{k=3} C'(k, 0) * p(k + M, j)}{\sum_{k=-3}^{k=3} C'(k, 0)}$$

In both equation 20 and equation 21, the filter coefficients for the boundary may be calculated as defined in equation 22 as defined below.

$$C'(k, l) = \begin{cases} 8, & C(k, l) == 8 \\ 2 * C(k, l), & \text{otherwise} \end{cases}$$ (Equation 22)

All of the pixels 202 remaining in the block 204 may be filtered using the 13 tap two dimensional cross filter 1000 as applied by equation 23, which is defined below.

$$F(i, j) = \frac{\sum_{l=-3}^{l=3} C(l, 0) * p(l + i, j) + \sum_{k=-3}^{k=3} C(0, k) * p(i, j + k)}{\sum_{l=-3}^{l=3} C(l, 0) + \sum_{k=-3}^{k=3} C(0, k)}$$ (Equation 23)

The resulting filtering process is based on the analysis of the video data 106, of FIG. 1, and may be applied to each of the pixels 202 in the block 204 based on its' position and the relative intensity within the block 204 as compared to the blocks 204 in adjacent positions.

Figure 11:
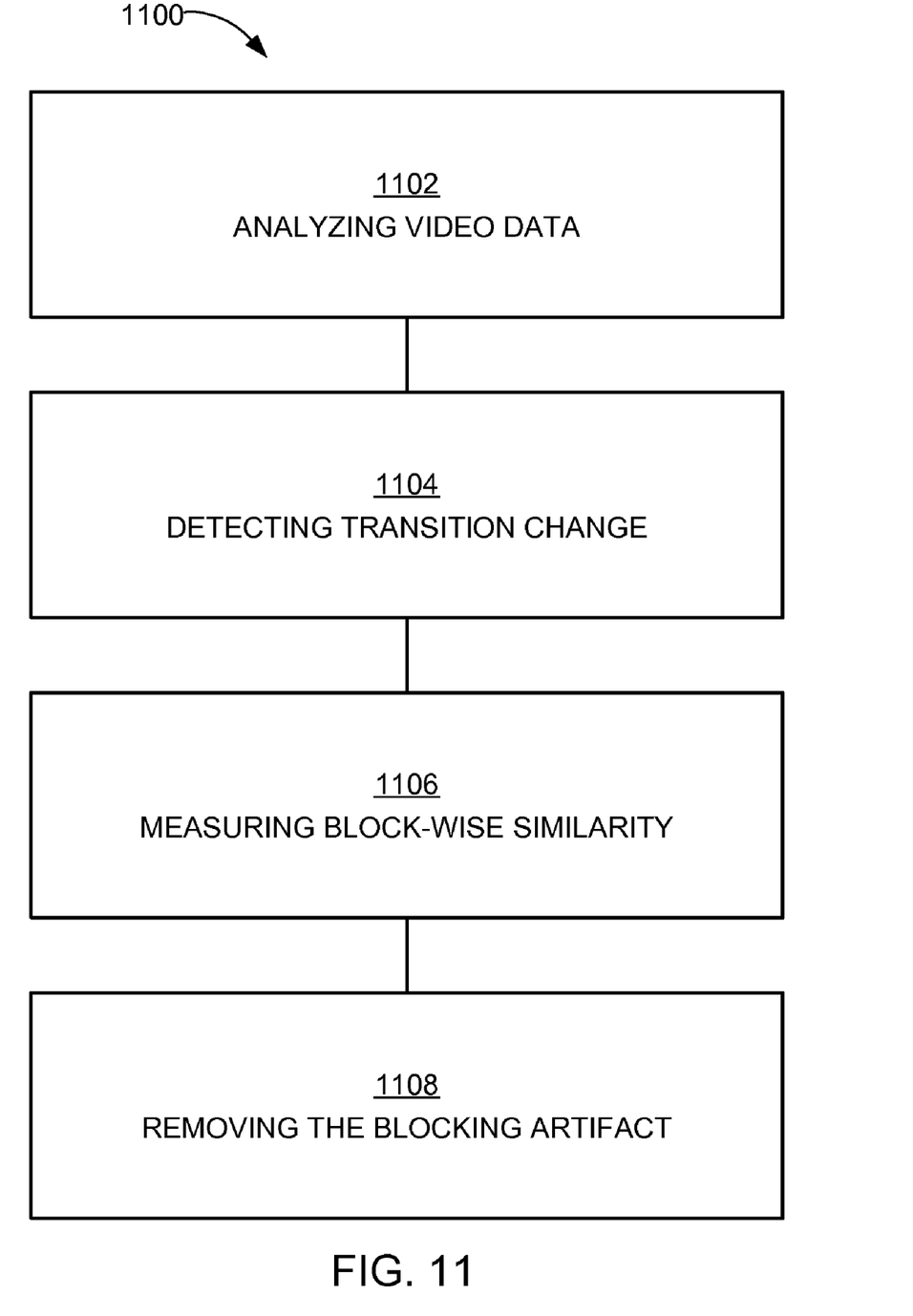
FIG. 11 is a flow chart of a video system with blocking artifact filtering for applying the video system with blocking artifact filtering, in an embodiment of the present invention.

Referring now to FIG. 11, therein is shown a flow chart of a video system with blocking artifact filtering 1100 for applying the video system with blocking artifact filtering 100 in an embodiment of the present invention. The system 1100 includes analyzing video data, having a block, in a block 1102; performing a transition change detection for determining a spatial intensity transition within the block in a block 1104; performing a block-wise similarity measurement on the block in the video data for identifying a blocking artifact in a block 1106; and filtering with a two dimensional cross filter every pixel in the block for removing the blocking artifact in a block 1108.

It has been discovered that the present invention thus has numerous aspects.

A principle aspect that has been unexpectedly discovered is that the present invention can effectively estimate the blocking artifacts level from the raw data Another aspect is that the present invention can take care of the pixels far away from the picture boundary. In doing so, the general encoding artifacts are also reduced Yet another important aspect of the present invention is that it valuably supports and services the historical trend of reducing costs, simplifying systems, and increasing performance.

These and other valuable aspects of the present invention consequently further the state of the technology to at least the next level.

Thus, it has been discovered that the blocking artifact filter system of the present invention furnishes important and heretofore unknown and unavailable solutions, capabilities, and functional aspects for improving the visual quality of low definition signals displayed on High Definition Televisions (HDTV). The resulting processes and configurations are straightforward, cost-effective, uncomplicated, highly versatile and effective, can be surprisingly and unobviously implemented by adapting known technologies, and are thus readily suited for efficiently and economically manufacturing HDTV devices fully compatible with conventional manufacturing processes and technologies.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hitherto fore set forth herein or shown in the accompanying drawings are to be interpreted in an illustrative and non-limiting sense.

What is claimed is:

1. A method of operating a video system comprising:
    analyzing video data, having a block;
    performing a transition change detection for determining a spatial intensity transition within the block;
    performing a block-wise similarity measurement on the block in the video data for identifying a blocking artifact includes:
        correlating, by a block correlation processor, the block in the video data,
        generating a correlation output by the block correlation processor performing a mean squared error calculation, and
        stepping an analysis area over an adjacent block bordering to a block being analyzed; and
    filtering, with a two dimensional cross filter, every pixel in the block for removing the blocking artifact.

2. The method as claimed in claim 1 further comprising determining a dominant direction output from the spatial intensity transition.

3. The method as claimed in claim 1 wherein filtering with a two dimensional cross filter includes:
    filtering, by a center tap in the two dimensional cross filter, pixels in the block;
    activating vertical taps evenly spaced above and below the center tap for filtering a column of the pixels in the block; and
    activating horizontal taps evenly spaced to the left and right of the center tap, for filtering a row of the pixels in the block.

4. The method as claimed in claim 1 further comprising calculating a filter coefficient for the two dimensional cross filter from the video data.

5. A method of operating a video system comprising:
- analyzing video data, having a block including analyzing a pixel of an adjacent block;
- performing a transition change detection for determining a spatial intensity transition within the block;
- performing a block-wise similarity measurement on the block in the video data for identifying a blocking artifact including identifying a horizontal boundary or a vertical boundary having the blocking artifact includes:
  - correlating, by a block correlation processor, the block in the video data including activating an execution array,
  - generating a correlation output by the block correlation processor performing a mean squared error calculation by the execution array, and
  - stepping an analysis area over an adjacent block bordering to a block being analyzed including activating a storage device by a controller for the execution array; and
- filtering, with a two dimensional cross filter, every pixel in the block for removing the blocking artifact including clearing a first column, a last column, a first row, or a last row of the blocking artifact.

6. The method as claimed in claim 5 further comprising determining a dominant direction output from the spatial intensity transition includes comparing a horizontal spatial variation and a vertical spatial variation.

7. The method as claimed in claim 5 wherein filtering with the two dimensional cross filter includes:
- filtering, by a center tap in the two dimensional cross filter, pixels in the block including applying a filter coefficient;
- activating vertical taps evenly spaced above and below the center tap for filtering a column of the pixels in the block including applying the filter coefficient for six of the vertical taps; and
- activating horizontal taps evenly spaced to the left and right of the center tap for filtering a row of the pixels in the block including applying the filter coefficient for six of the horizontal taps.

8. The method as claimed in claim 5 further comprising calculating a filter coefficient for the two dimensional cross filter from the video data including configuring a symmetrical filter.

9. A blocking artifact filter system comprising:
- a circuit element for processing video data;
- a blocking artifact detection circuit in the circuit element for determining that a blocking artifact is present within the video data;
- a block-wise similarity checker coupled to the blocking artifact detection circuit for identifying the blocking artifact includes:
  - a block correlation processor,
  - a correlation output generated by the block correlation processor by a mean squared error calculation performed, and
  - a storage device in the block correlation processor for moving an analysis area over an adjacent block in the video data; and
- a two dimensional cross filter applied to every pixel in the video data for removing the blocking artifact.

10. The system as claimed in claim 9 further comprising a transition change detector in the circuit element for detecting a natural transition change in the video data.

11. The system as claimed in claim 9 wherein the two dimensional cross filter includes:
- a center tap in the two dimensional cross filter;
- vertical taps evenly spaced above and below the center tap; and
- horizontal taps evenly spaced to the left and right of the center tap.

12. The system as claimed in claim 9 further comprising a filter coefficients generator coupled to the two dimensional cross filter for monitoring the video data.

13. The system as claimed in claim 9 further comprising:
- a magnitude comparator in the blocking artifact detection circuit;
- a video demultiplexer coupled to the magnitude comparator for identifying the blocking artifact; and
- a video output bus coupled to the two dimensional cross filter for transferring the video data free of the blocking artifact.

14. The system as claimed in claim 13 further comprising a transition change detector in the circuit element for detecting a natural transition change in the video data includes a spatial range extraction circuit coupled to the transition change detector.

15. The system as claimed in claim 13 wherein the block-wise similarity checker includes:
- an execution array in the block correlation processor; and
- a controller coupled to the execution array.

16. The system as claimed in claim 13 wherein the two dimensional cross filter includes:
- a center tap in the two dimensional cross filter;
- vertical taps evenly spaced above and below the center tap includes six of the vertical taps; and
- horizontal taps evenly spaced to the left and right of the center tap includes six of the horizontal taps.

17. The system as claimed in claim 13 further comprising a filter coefficients generator coupled to the two dimensional cross filter for monitoring the video data includes a symmetrical filter configured for removing the blocking artifact.

* * * * *